United States Patent
Kim (10) Patent No.: US 8,454,081 B2
(45) Date of Patent: Jun. 4, 2013

(54) SLIDING DOOR SAFETY DEVICE FOR HEAVY CONSTRUCTION EQUIPMENT

(75) Inventor: Kang Tae Kim, Changwon (KR)

(73) Assignee: Volvo Construction Equipment Holding Sweden AB, Eskiltuna (SE)

( * ) Notice: Subject to any disclaimer, the term of this patent is extended or adjusted under 35 U.S.C. 154(b) by 0 days.

(21) Appl. No.: 12/554,700

(22) Filed: Sep. 4, 2009

(65) Prior Publication Data
US 2010/0058666 A1    Mar. 11, 2010

(30) Foreign Application Priority Data
Sep. 5, 2008    (KR) .................. 10-2008-0087777

(51) Int. Cl.
*B62D 33/06*    (2006.01)
*B60J 5/12*    (2006.01)

(52) U.S. Cl.
USPC ..................... 296/190.11; 296/155

(58) Field of Classification Search
USPC .............................. 296/155, 190.11
See application file for complete search history.

(56) References Cited

U.S. PATENT DOCUMENTS

| | | | | |
|---|---|---|---|---|
| 4,640,050 A | * | 2/1987 | Yamagishi et al. | 49/280 |
| 5,577,795 A | * | 11/1996 | Shinsen | 296/190.11 |
| 6,178,699 B1 | * | 1/2001 | Kawanobe et al. | 49/360 |
| 7,753,436 B2 | * | 7/2010 | Kim et al. | 296/155 |

* cited by examiner

*Primary Examiner* — Dennis Pedder
(74) *Attorney, Agent, or Firm* — Ladas & Parry LLP (57) ABSTRACT

A sliding door safety device for heavy construction equipment is provided, which includes an outer side wall having a doorway formed thereon, an upper rail and a lower rail formed on an upper part and a lower part of the outer side wall, respectively, a sliding door sliding to move to a front or rear side of a cab by an upper roller and a lower roller engaged with the upper rail and the lower rail, respectively, to open or close the doorway, and first and second door position sensing switches mounted on one side of the outer side wall to sense a door position when the door is in its open position where the door is fully opened or in its closed position where the door is fully closed.

10 Claims, 11 Drawing Sheets

SLIDING DOOR SAFETY DEVICE FOR HEAVY CONSTRUCTION EQUIPMENT

CROSS-REFERENCE TO RELATED APPLICATION

This application is based on and claims priority from Korean Patent Application No. 10-2008-0087777, filed on Sep. 5, 2008 in the Korean Intellectual Property Office, the disclosure of which is incorporated herein in its entirety by reference.

FIELD OF THE INVENTION

The present invention relates to a sliding door safety device for heavy construction equipment, and more particularly, to a sliding door safety device for heavy construction equipment, which can quickly provide alarm notification to an operator and properly control the lever operation and the hydraulic operation of a working device when a sliding door mounted on a cab is not fixedly kept in an open position where the sliding door is fully opened or in a closed position where the sliding door is fully closed, and secedes from the open position or the closed position due to trouble of a door locking device, rails and a roller device, vibration of the equipment, and the like.

BACKGROUND OF THE INVENTION

Generally, in heavy construction equipment such as an excavator, a cab door, which is opened or closed by a hinge structure, has the problem that it may be interfered with an external object, such as a surrounding building or tree, when the equipment performs a swing operation in a downtown area or in a confined place. In order to solve this problem, a sliding door device provided with a sliding door and guide rails on a cab has been known. The sliding door device enables the door to be opened or closed by guiding the sliding movement of the door on the guide rails when the door is opened or closed.

As illustrated in FIGS. 1 to 3D, a conventional sliding door device for heavy construction equipment includes a sliding door 3 sliding to move on an outer side wall 2a of a cab 2; a plurality of rails 4, 5, and 6 formed in upper, lower, and center parts of the outer side wall 2a; a plurality of rollers 7, 8, and 9 mounted on the door 3 to support the door 3 when the door 3 slides between a closed position where a doorway 2b is closed and an open position where the doorway 2b is open; a plurality of pairs of strikers 10, 11, 12, and 13, each of the pairs of strikers including a female striker 10 or 12 and a male striker 11 or 13, one of the strikers of each pair being mounted on the door 3, and the other striker of the respective pair being mounted on an outer side wall 2c, so that at least one pair of strikers are engaged with each other when the door is in its closed position and at least one pair of strikers are engaged with each other when the door is in its fully opened position; wherein at least one of the plurality of pairs of strikers 10, 11, 12, and 13 is mounted for engaging each other at a front edge portion of the door 3 when the door 3 is fully opened, and at least one other pair of the plurality of pairs of strikers is mounted for engaging each other at a rear edge portion of the door 3 when the door 3 is fully opened.

The conventional sliding door device as described above is disclosed in U.S. Pat. No. 5,577,795. An upper roller 7 includes a guide roller 7a that moves along an upper rail 4 when a door 3 is opened or closed, and a lower roller 8 includes a rolling roller 8a which is rotated in an X-axis direction (that means the front/rear direction of a cab) along the lower rail 5 to support the load of the door 3 when the door 3 is opened or closed, and a guide roller 8b which is rotated in a Y-axis direction (that means each side direction of the cab) to prevent the door 3 from seceding from the lower rail 5 when the door 3 is opened or closed (See FIG. 2).

Also, referring to FIG. 3, a center roller 9 mounted on the door 3 includes a rolling roller 9a which is rotated in an X-axis direction to support the load of the door 3 when the door 3 is opened or closed, and a guide roller 9b which is rotated in a Y-axis direction to prevent the door 3 from seceding from the center rail 6 when the door 3 is opened or closed.

Figure 1:
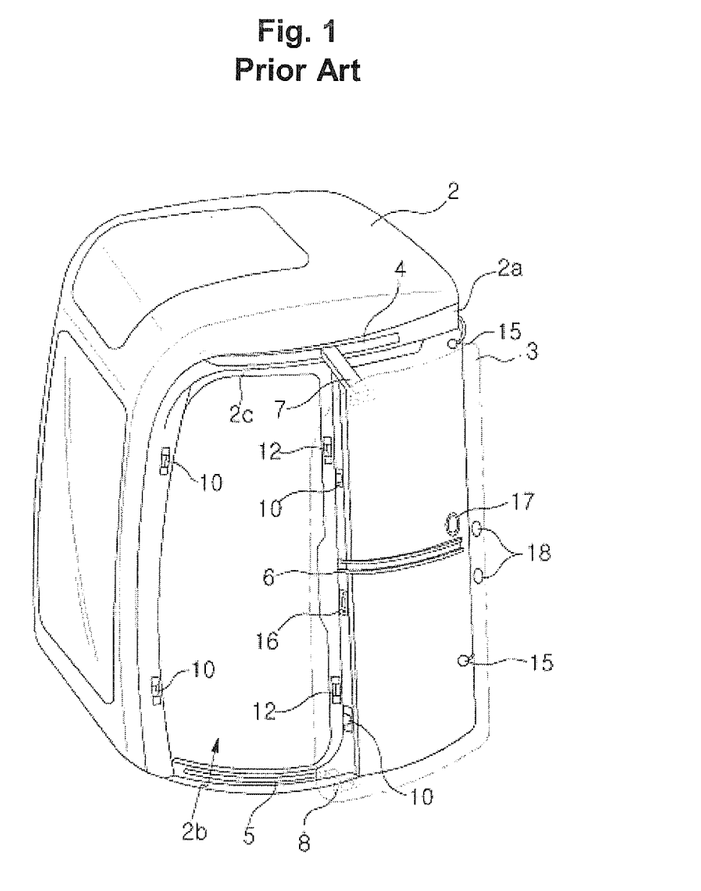
FIG. 1 is a perspective view of a cab in the prior art.
Figure 2:
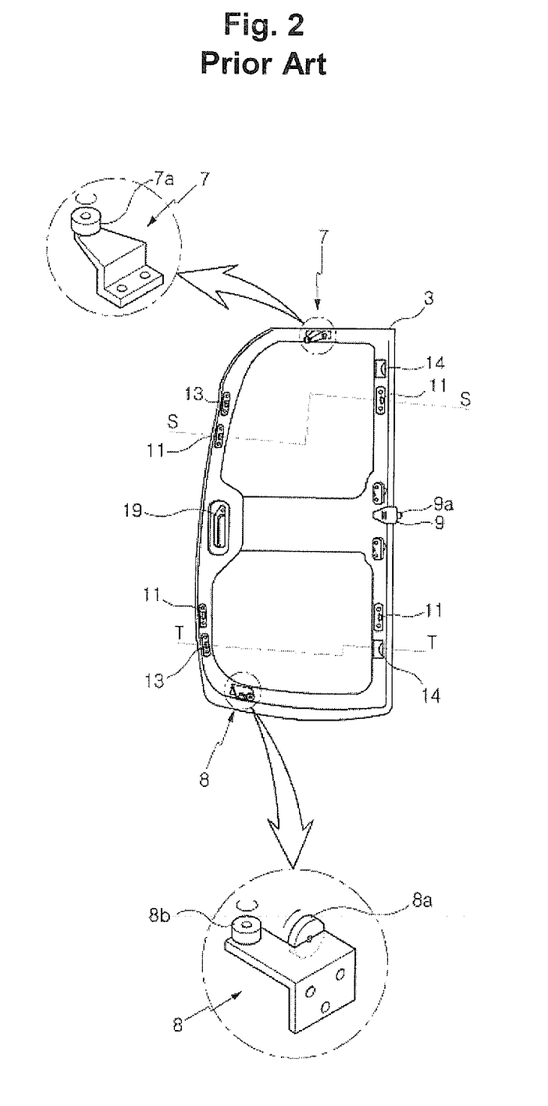
FIG. 2 is a side view of a sliding door as shown in FIG. 1.
Figure 3A:
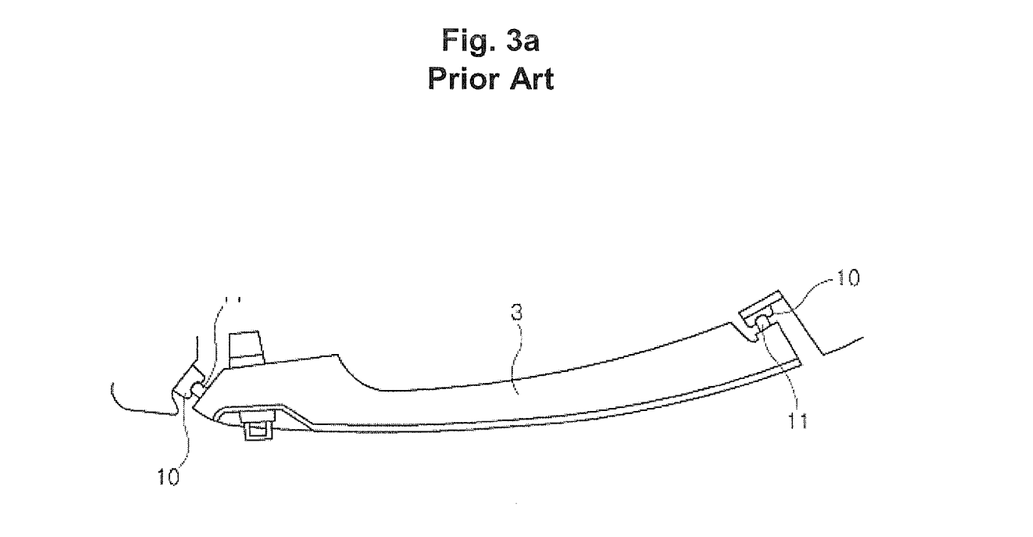
FIG. 3A is a section view along line S-S in FIG. 2, showing the sliding door in a closed state.
Figure 3B:
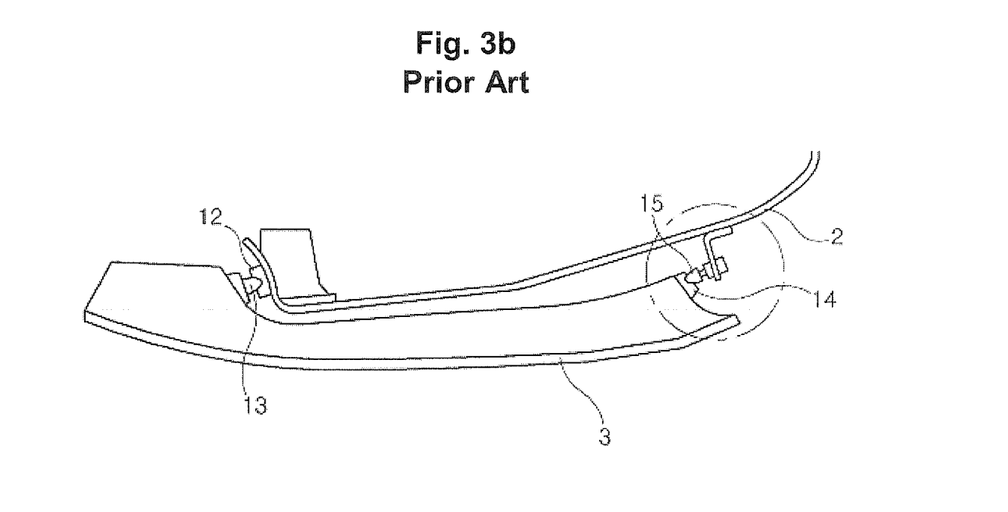
FIG. 3B is a section view along line T-T in FIG. 2, showing the sliding door in an open state.
Figure 3C:
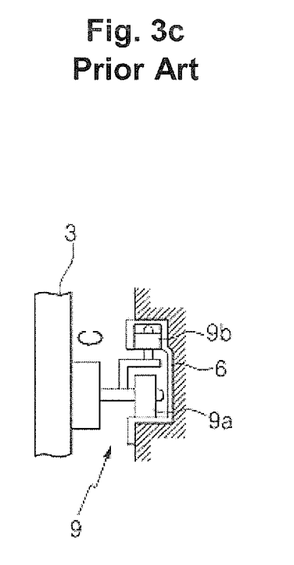
FIG. 3C is a sectional view of a center rail and a center roller as shown in FIG. 1.
Figure 3D:
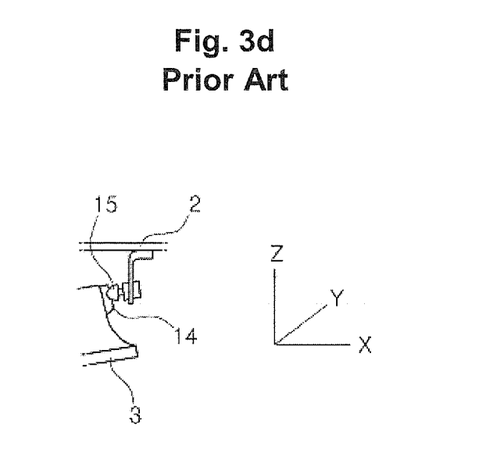
FIG. 3D is an enlarged view of a part indicated by a circle in FIG. 3B.

As described above, in the conventional sliding door device, the female and male strikers 10 and 11 are engaged with each other in a door closed position as illustrated in FIG. 3A, while in a door open position, the female and male strikers 12, 13, 14, and 15 are engaged with each other when the door 3 is moved in the X-axis direction and approaches the rear side of the door, as illustrated in FIGS. 3B and 3D.

According to the conventional sliding door device as described above, the sliding movement of the door forms a straight or curved trace, and the load and the structure of the door or the structure of the rails may greatly hinder the opening and closing of the door. In order to improve this, continuous research and development are required.

The conventional sliding door for heavy construction equipment has the problem that the door is not kept in an open position where the sliding door is fully opened or in a closed position where the sliding door is fully closed, and secedes from the open position or the closed position due to trouble of a sliding door locking device or a door holder for fixedly keeping the open position and the closed position of the door, trouble of an upper rail or a lower rail, vibration of the equipment, and the like.

That is, according to the conventional sliding door device, due to long-term use of the door and so on, the locking state of the door is released in a fully open/closed position of the door, and the door is arbitrarily moved in front/rear direction of a cab due to the self-weight of the door even if a small vibration or impact occurs, causing the occurrence of damage of rails or rollers and safety accident.

Also, the conventional sliding door device has the problem that, in the case where the open/closed state of the door becomes unstable during working of the construction equipment, an operator in a cab should control the open/closed state of the door at any time to deteriorate the workability, and contact and interference may occur between a control lever of a working device and the body of the operator to cause the malfunction of the equipment and to reduce the manipulability.

SUMMARY OF THE INVENTION

Accordingly, the present invention has been made to solve the above-mentioned problems occurring in the prior art while advantages achieved by the prior art are maintained intact.

One object of the present invention is to provide a sliding door safety device for heavy construction equipment, which can sense a secession of a sliding door when the door secedes from an open position where the door is fully opened or a closed position where the door is fully closed.

Another object of the present invention is to provide a sliding door safety device for heavy construction equipment, which can provide alarm notification to an operator, and control the driving of an operation lever in a cab and an actuator of a working device when the door secedes from an open position or a closed position of the door to improve the manipulability and working performance of the equipment.

In order to accomplish these objects, there is provided a sliding door safety device for heavy construction equipment, according to an embodiment of the present invention, which includes an outer side wall having a doorway formed thereon; an upper rail and a lower rail formed on an upper part and a lower part of the outer side wall, respectively; a sliding door sliding to move to a front or rear side of a cab by an upper roller and a lower roller engaged with the upper rail and the lower rail, respectively, to open or close the doorway; and first and second door position sensing switches mounted on one side of the outer side wall to sense a door position when the door is in its open position where the door is fully opened or in its closed position where the door is fully closed.

The door position sensing switches may be limit switches.

An upper roller support bracket may be installed on the inside of the sliding door so that the upper roller is engaged with the upper rail to be rotatable, and a switch driving member for driving the first door position sensing switch may be provided on the support bracket.

A lower roller support bracket may be installed on the inside of the sliding door so that the lower roller is engaged with the lower rail to be rotatable, and a switch driving member for driving the second door position sensing switch may be provided on one side of the support bracket.

The door position sensing switch may be connected to an electronic controller, and may generate a door secession signal when the sliding door secedes from the open position or the closed position.

The sliding door safety device according to an embodiment of the present invention may further include an alarm which is installed in the cab and is controlled by the electronic controller to provide an alarm signal to an operator when the sliding door secedes from the open position or the closed position.

If the upper roller moves the upper rail and the sliding door secedes from the fully open position or the fully closed position of the door, either of the first and second door position sensing switches may generate a door secession signal.

If the lower roller moves the lower rail and the sliding door secedes from the fully open position or the fully closed position of the door, either of the first and second door position sensing switches may generate a door secession signal.

The sliding door safety device according to an embodiment of the present invention may further include a center rail formed on the outer side wall of the cab, and a center roller formed on the sliding door to be engaged with the center rail.

The sliding door safety device according to an embodiment of the present invention may further include an upper stopper in the open position, mounted on the outer side wall in the open position where the sliding door is fully open, the upper stopper being in contact with the upper roller to prevent the sliding door from shaking when the sliding door is fully open; and a lower stopper in the open position, mounted on the outer side wall in the open position where the sliding door is fully open, the lower stopper being in contact with the lower roller to prevent the sliding door from shaking when the sliding door is fully open; wherein the door position sensing switches are installed adjacent to the upper stopper and the lower stopper, respectively.

The sliding door safety device according to an embodiment of the present invention may further include a center stopper in the open position, mounted on the outer side wall in the open position where the sliding door is fully open, the center stopper being in contact with the center roller to prevent the sliding door from shaking when the sliding door is fully open.

The sliding door safety device according to an embodiment of the present invention may further include a door fixing holder that fixes the sliding door in the open position when the sliding door is fully opened.

The sliding door safety device according to an embodiment of the present invention may further include a working device operation lever and a working device actuator member which are connected to the electronic controller; wherein, when the door secession signal is applied from the door position sensing switch, the electronic controller selectively controls the operation of the working device operation lever and the working device actuator member.

The sliding door safety device according to an embodiment of the present invention may further include a switch driving member provided on one side of an inner panel of the sliding door, wherein, when the sliding door is in the open position or the closed position, either of the first and second door position sensing switches is driven by the switch driving member.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. The same reference indicators will be used throughout the drawings and the following detailed description to refer to the same or like parts. The matters defined in the description, such as the detailed construction and elements, are nothing but specific details provided to assist those of ordinary skill in the art in a comprehensive understanding of the invention, and thus the present invention is not limited thereto.

In the description of the present invention, X-axis direction means a front/rear direction of a cab that is provided in the rear of a working device such as a boom, Y-axis direction means a left/right direction of the cab, and Z-axis direction means an upper/lower direction of the cab.

Figure 4:
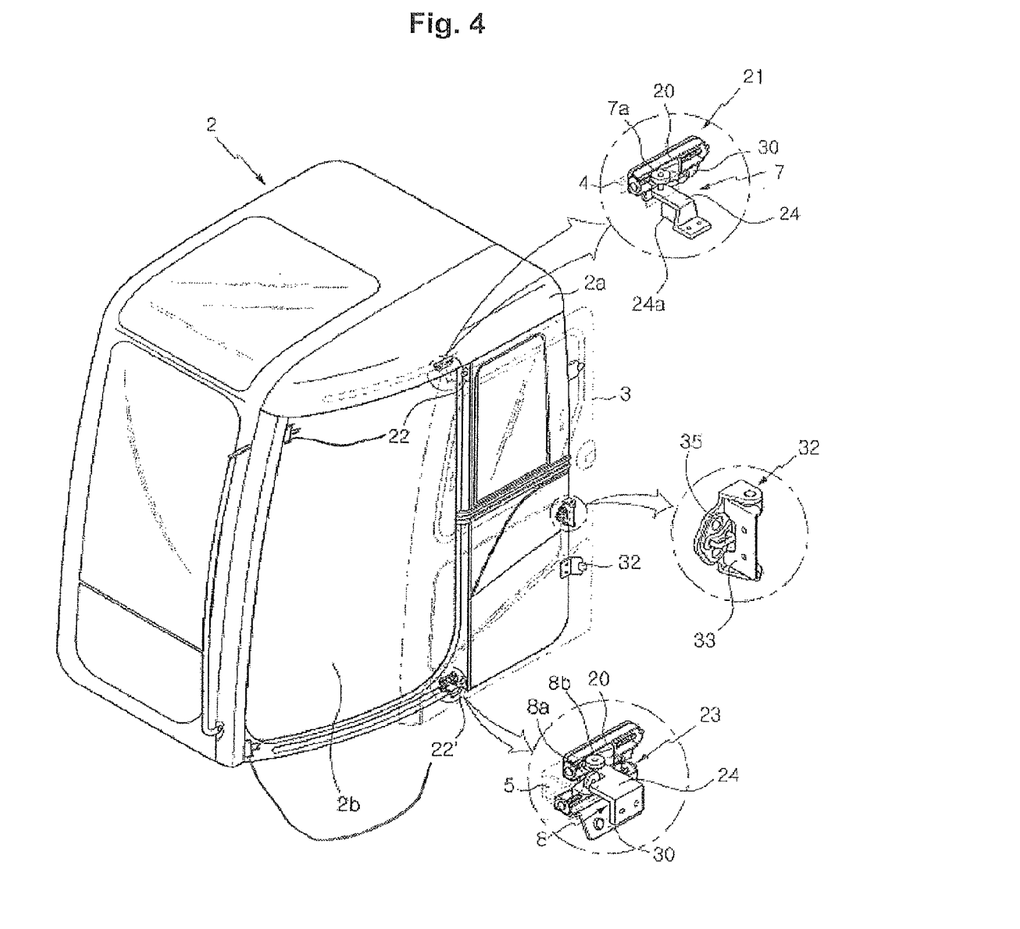
FIG. 4 is a perspective view illustrating a sliding door safety device for heavy construction equipment according to an embodiment of the present invention.

As illustrated in FIG. 4, the sliding door safety device according to an embodiment of the present invention can be provided in a cab of heavy construction equipment having a sliding door to sense the open position and the closed position of the door.

The sliding door safety device for heavy construction equipment according to an embodiment of the present invention includes an outer side wall 2a having a doorway 2b formed thereon; an upper rail 4 and a lower rail 5 formed on an upper part and a lower part of the outer side wall 2a, respectively; a sliding door 3 sliding to move to a front or rear side of a cab 2 by an upper roller 7 and a lower roller 8 engaged with the upper rail 4 and the lower rail 5, respectively, to open or close the doorway 2a; and first and second door position sensing switches 22 and 22' mounted on one side of the outer side wall 2a to sense a door position when the door 3 is in its open position where the door 3 is fully opened or in its closed position where the door 3 is fully closed.

Preferably, the door position sensing switches 22 and 22' are limit switches which generate electric signals when the sliding door 3 is in its open position where the door is fully opened or in its closed position where the door is fully closed.

Figure 6:
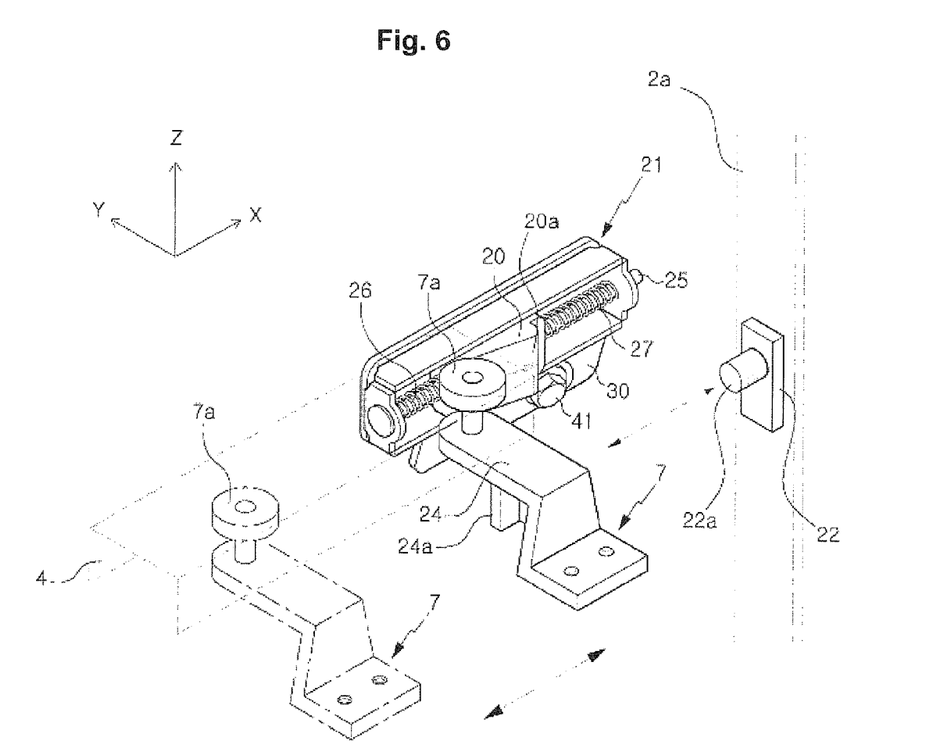
FIG. 6 is a view explaining the operation state of a door position sensing switch in accordance with the movement of an upper roller as shown in FIG. 4.
Figure 8:
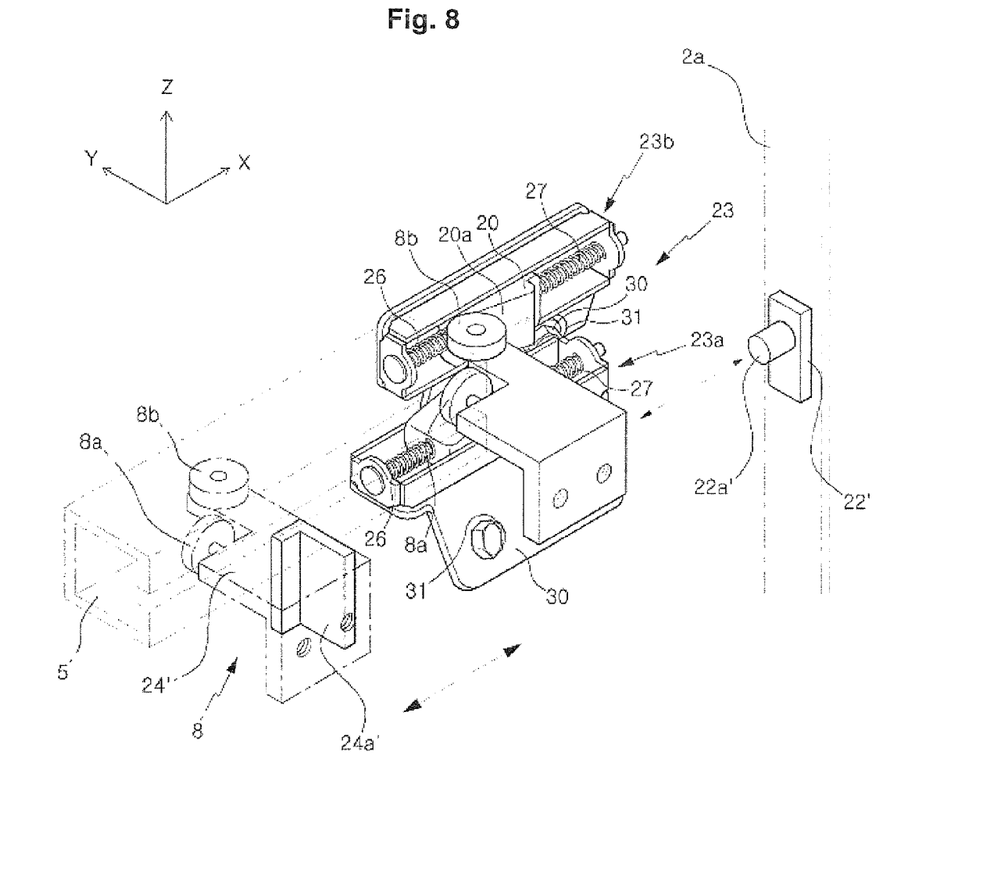
FIG. 8 is a view explaining the operation state of a door position sensing switch in accordance with the movement of an lower roller as shown in FIG. 4.

Referring to FIG. 6, the upper roller 7 includes a guide roller 7a that is rotated in a Y-axis direction along the upper rail 4 when the sliding door 3 is opened or closed. Referring to FIG. 8, the lower roller 8 includes a first lower roller (that means a rolling roller 8a of the lower roller 8) which is rotated in an X-axis direction along the lower rail 5 to support the load of the sliding door 3 when the sliding door 3 is opened or closed, and a second lower roller (that means a guide roller 8b of the lower roller 8) which is rotated in a Y-axis direction to prevent the sliding door 3 from seceding from the lower rail 5 when the sliding door 3 is opened or closed.

In the present invention, referring back to FIG. 6, an upper roller support bracket 24 is installed on the inside of the sliding door 3 so that the upper roller 7 is engaged with the upper rail 4 to be rotatable, and a switch driving member 24a is provided on one side of the support bracket 24. The switch driving member 24a becomes in contact with and secedes from a contact part 22a of the first door position sensing switch 22 so that the first door position sensing switch 22 performs the door position sensing function when the door 3 is in the open position and in the closed position, respectively.

Also, referring back to FIG. 8, a lower roller support bracket 24' is installed on the inside of the sliding door 3 so that the lower roller 8 is engaged with the lower rail 5 to be rotatable, and a switch driving member 24a' is provided on one side of the lower roller support bracket 24'. The switch driving member 24a' becomes in contact with and secedes from a contact part 22a' of the second door position sensing switch 22' so that the second door position sensing switch 22' performs the door position sensing function when the door 3 is in the open position and in the closed position, respectively.

It is preferable to form the respective switch driving members 24a and 24a' in a body with the sides of the upper roller and lower roller support brackets 24 and 24' so that the switch driving members 24a and 24a' perform the operation of the door position sensing switches 22 and 22', respectively, when the sliding door 3 is in the open position and in the closed position.

In the present invention, elastic members including springs may be further installed on the sides of the upper roller and lower roller support brackets 24 and 24', respectively, so that the respective switch driving members 24a and 24a' have elastic forces, and to do so is preferable in buffering impact that acts on the first and second door position sensing switches 22 and 22', the upper roller 7, and the lower roller 8, respectively, when the door 3 is in the open position and in the closed position.

On the other hand, if the upper roller 7 moves along the upper rail 4 and the sliding door 3 secedes from the fully open position or the fully closed position, either of the first and second door position sensing switches 22 and 22' generates a door secession signal, while if the lower roller 8 moves along the lower rail 5 and the sliding door 3 secedes from the fully open position or the fully closed position, either of the first and second door position sensing switches 22 and 22' generates a door secession signal.

Preferably, the first door position sensing switch 22 performs the door position sensing function in a manner that if the sliding door 3 is in the open position, the switch driving member 24a of the upper roller support bracket 24 becomes in contact with the contact part 22a of the first door position sensing switch 22 to support the contact part, while if the sliding door 3 moves along the upper rail 4 and secedes from the open position of the door, the first door position sensing switch 22 generates the door secession signal.

Also, the second door position sensing switch 22' performs the door position sensing function in a manner that if the sliding door 3 is in the closed position, the switch driving member 24a' of the lower roller support bracket 24' becomes in contact with the contact part 22a' of the second door position sensing switch 22' to support the contact part, while if the sliding door 3 moves along the lower rail 5 and secedes from the closed position of the door, the second door position sensing switch 22' generates the door secession signal.

Figure 10:
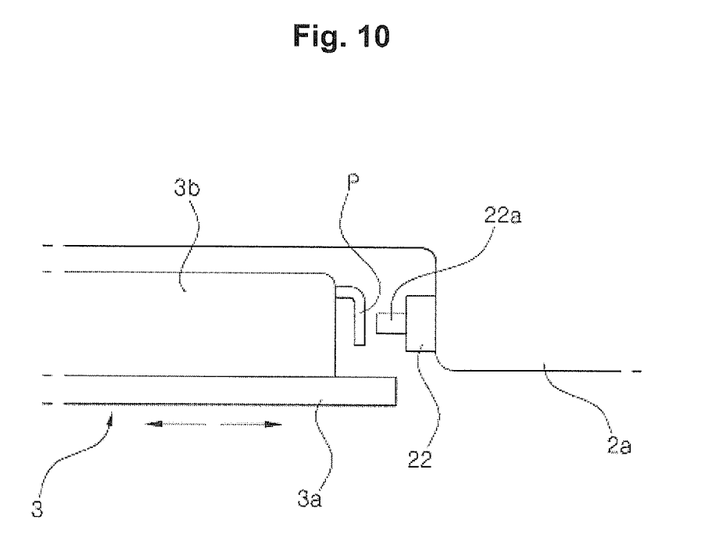
FIG. 10 is a schematic view illustrating the operation state of a switch driving member installed on an inner panel of the door to operate a door position sensing switch according to another embodiment of the present invention.

In another embodiment of the present invention, as illustrated in FIG. 10, the switch driving member 24a or 24a' is provided on one side of an inner panel 3b of the sliding door 3, and either of the first door position sensing switch 22 and the second door position sensing switch 22' is operated to provide the door secession signal to the electronic controller 25 when the sliding door 3 is in the open position or in the closed position. In the case where the respective switch driving members 24a and 24a' are provided on one side of the inner panel 3b of the sliding door 3, at least one of the switch driving members 24a and 24a' is provided with a projection part P which projects from the inner panel 3b and is in contact with the contact part 22a or 22a' of the first or second door position sensing switch 22 or 22'.

Figure 5:
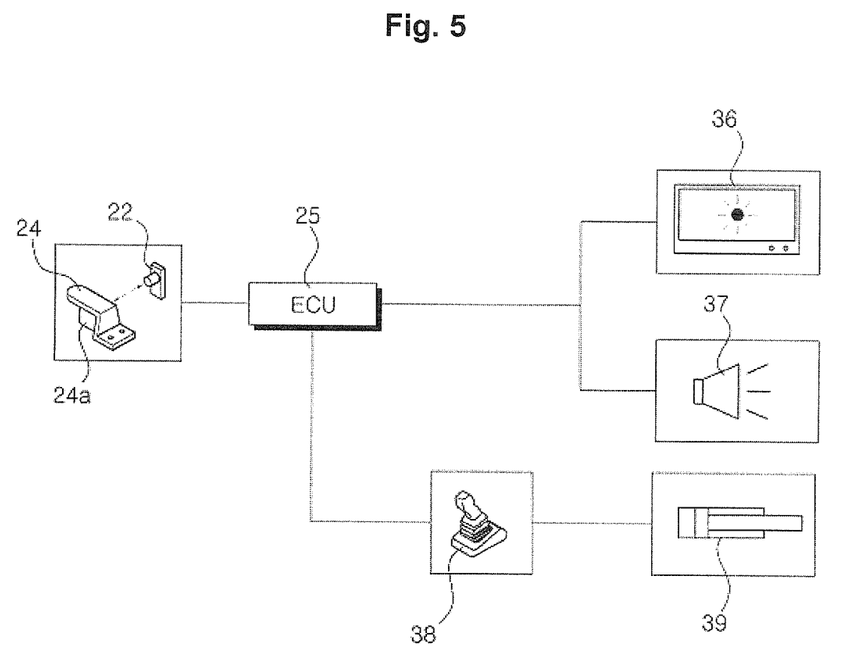
FIG. 5 is a schematic view illustrating a flow of controlling a working device by a door secession signal of a door position sensing switch according to an embodiment of the present invention.

On the other hand, referring to FIG. 5, the first and second door position sensing switches 22 and 22' are connected to an electronic controller 25, and the door position sensing switches 22 and 22' provide door secession signals to the electronic controller 25 when the sliding door secedes from the open position or the closed position.

The electronic controller 25 is connected to an alarm 37 installed inside the cab 2. The electronic controller 25 is also connected to a monitor 36 installed inside the cab 2, a working device operation lever 38, and a working device actuator member 39 that is driven under the control of the working device operation lever 38.

When the door secession signal generated by the respective door position sensing switch 22 or 22' is inputted, the electronic controller 25 operates the monitor 36 and the alarm 37 for operator alarm, and controls an electric signal and a hydraulic signal for selecting the driving range of the working device operation lever 38 and the working device actuator member 39.

That is, when the sliding door 3 secedes from the open position or the closed position, the first and second door position sensing switches 22 and 22' perform the door position sensing function, and thus the electronic controller 25 can perform the electric operation of the working device operation lever 38 and the control of hydraulic driving rate of the working device actuator member 39.

For example, in one embodiment of the present invention, the first door position sensing switch 22 generates the door secession signal when the upper roller 7 secedes from the upper rail 4. Also, the second door position sensing switch 22' generates the door secession signal when the lower roller 8 secedes from the lower rail 5.

Figure 9:
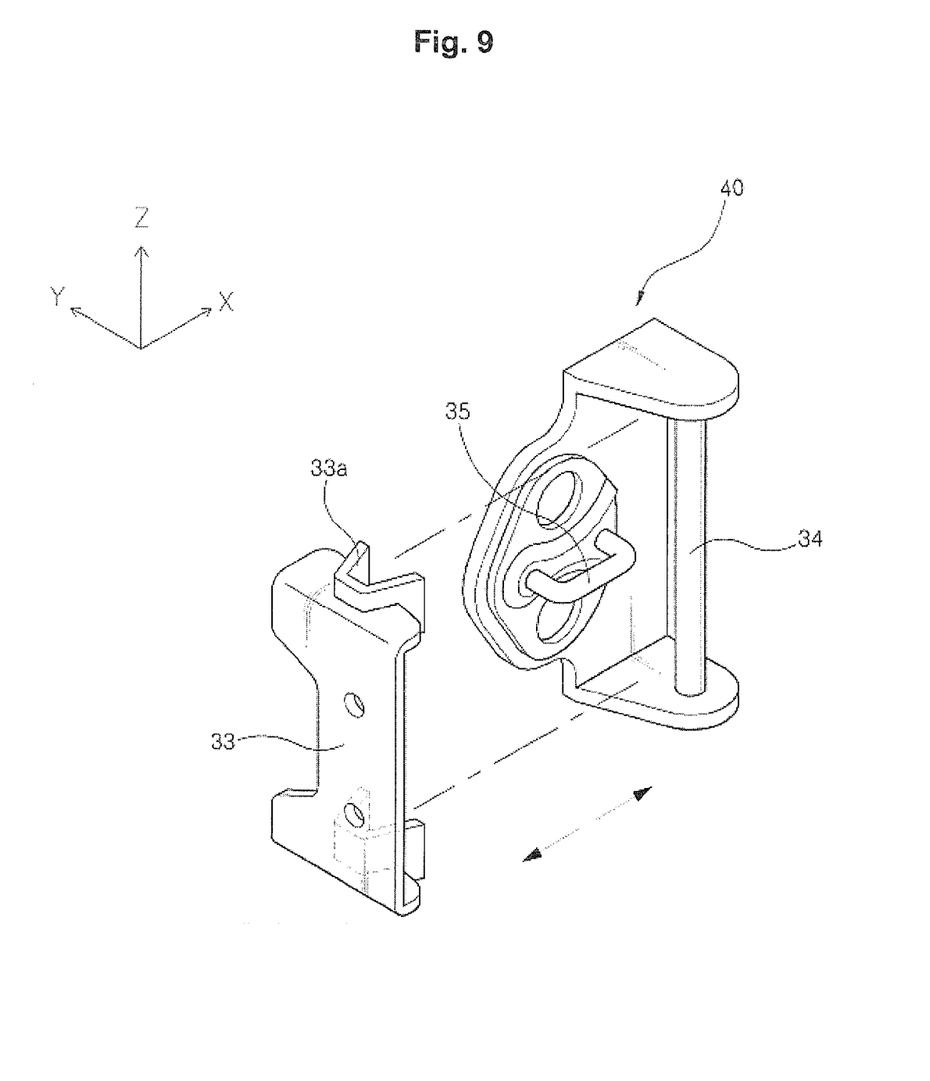
FIG. 9 is a view illustrating the use state of a door fixing holder as shown in FIG. 4.

On the other hand, as illustrated in FIG. 9, the sliding door safety device according to an embodiment of the present invention further includes a door fixing holder 40 that fixes the sliding door in the open position when the sliding door is fully opened. The door fixing holder 40 includes a stopper bar 34 installed on one side of the outer side wall 20, and a holding plate 33 installed on the inside of the sliding door 3 to be engaged with the stopper bar 34.

On one side of the stopper bar 34, a locking piece 35 for fastening a fixing locking member (not illustrated) including a hook member or a locking striker is formed.

Figure 7:
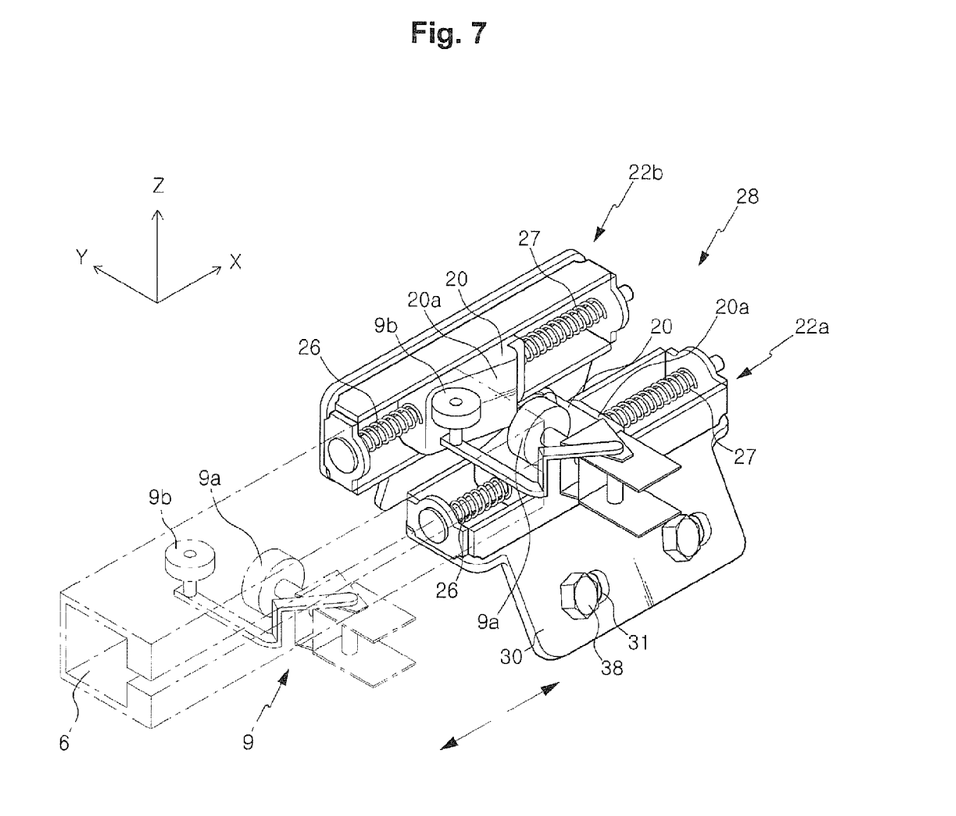
FIG. 7 is a view illustrating the use state of a center stopper as shown in FIG. 4.

Also, as illustrated in FIG. 7, the sliding door safety device according to an embodiment of the present invention further includes a center rail 6 formed on the outer side wall 2a of the cab 2, and a center roller 9 formed on the sliding door 3 to be engaged with the center rail 6. The center roller 9 includes a first center roller (which means a rolling roller 9a of the center roller 9) that is rotated in X-axis direction along the center rail 6 to support the load of the sliding door 3 when the sliding door 3 is opened or closed, and a second center roller (which means a guide roller 9b of the center roller 9) that is rotated in Y-axis direction to prevent the sliding door 3 from seceding from the center rail 6 when the sliding door 3 is opened or closed.

Referring back to FIGS. 6 and 8, the sliding door safety device according to an embodiment of the present invention further includes an upper stopper 21 in the open position, mounted on the outer side wall 2a in the open position where the sliding door 3 is fully open, the upper stopper 21 being in contact with the upper roller 7 to prevent the sliding door from shaking when the sliding door 3 is fully open; and a lower stopper 23 in the open position, mounted on the outer side wall 2a in the open position where the sliding door 3 is fully open, the lower stopper 23 being in contact with the lower roller 8 to prevent the sliding door 3 from shaking when the sliding door 3 is fully open; wherein the door position sensing switches 22 and 22' are installed adjacent to the upper stopper 21 and the lower stopper 23, respectively.

Referring back to FIG. 7, the sliding door safety device according to an embodiment of the present invention further includes a center stopper 28 in the open position, mounted on the outer side wall 2a in the open position where the sliding door 3 is fully open, the center stopper being in contact with the center roller 9 to prevent the sliding door 3 from shaking when the sliding door 3 is fully open.

In one embodiment of the present invention, referring back to FIG. 6, the upper stopper 21 fixes a pad 20 by elastic restoring force of elastic members 26 and 27 elastically installed on a guide 25. The guide roller 7a is pressed in X-axis direction (i.e. the front/rear direction of the cab 2) as shown in the drawing by the structure of an inclined surface 20a of the pad 20 of which the position is fixed, and thus the sliding door 3 is prevented from shaking or moving in the X-axis direction. Also, the guide roller 7a of the upper roller 7 is pressed in Y-axis direction (i.e. the side direction of the cab 2) as shown in the drawing by the contact support of the pad 20, and thus the sliding door 3 is prevented from shaking or moving in the Y-axis direction.

Also, referring back to FIG. 8, the lower stopper 23 includes a first lower stopper 23a installed to press the first lower roller (i.e. the rolling roller 8a of the lower roller 8) in X-axis and Z-axis directions by the contact of the pad 20 to prevent the sliding door 3 from shaking in the X-axis (i.e. the side direction of the cab 2) and Z-axis (i.e. the upper/lower direction of the cab 2) directions when the sliding door 3 is fully opened or closed; and a second lower stopper 23b installed to press the second lower roller (i.e. the guide roller 8b of the lower roller 8) in X-axis and Y-axis directions by the contact of the pad 20 to prevent the sliding door 3 from shaking in the X-axis and Y-axis directions when the sliding door 3 is fully opened or closed.

Also, referring back to FIG. 7, the center stopper 28 includes a first center stopper 22a installed to press the first center roller (i.e. the rolling roller 9a of the center roller 9) in X-axis and Z-axis directions by the contact of the pad 20 to prevent the sliding door 3 from shaking in the X-axis and Z-axis directions when the sliding door 3 is fully opened; and a second center stopper 22b installed to press the second center roller (i.e. the guide roller 9b of the center roller 9) in X-axis and Y-axis directions by the contact of the pad 20 to prevent the sliding door 3 from shaking in the X-axis and Y-axis directions when the sliding door 3 is fully opened.

In modified embodiments of the present invention, the upper stopper 21, the center stopper 28, and the lower stopper 23, as described above, may be installed to be positioned in inner end parts of the upper rail 4, the center rail 6, and the lower rail, respectively, in the open position where the sliding door 3 is fully opened. Also, according to circumstances, the upper stopper 21 or the lower stopper 23 may be modified to be positioned in the inner end part of the upper rail 4 or the lower rail 5 in the closed position where the sliding door 3 is fully closed and in the open position where the sliding door 3 is fully opened.

In the sliding door safety device according to the present invention, the switch driving members 24a and 24a' formed on the upper roller and lower roller support brackets 24 and 24' are arranged adjacent to an upper pillar and a lower pillar of the outer side wall 2a having the doorway 2b formed thereon, respectively, when the sliding door 3 approaches the open position and the closed position thereof in the opening and closing processes of the sliding door 3, and finally become in selective contact with the first and second door position sensing switches 22 and 22', respectively, when the sliding door 3 is in the open position and in the closed position.

However, if the sliding door 3 is not normally kept in the open position or the closed position of the door and secedes from the open position or the closed position due to the trouble of the typical sliding door locking device, the door holder 40, the upper rail 4, or the lower rail 5, and the vibration of the equipment, the first or second door position sensing switch 22 or 22' according to the present invention quickly senses this.

For example, if the sliding door 3 secedes from the open position formed on the outer side wall 2a of the doorway 2b, the contact between the switch driving member 24a of the support bracket 24 and the contact part 22a of the first door position sensing switch 22 is released, and the first door position sensing switch 22 provides the door secession signal (e.g. electric on/off signal of the limit switch) to the electronic controller 25.

When the door secession signal generated by the first door position sensing switch 22 is received, the electronic controller 25 provides audible and visible alarm signals to the monitor 36 and the alarm 37, and simultaneously limits or stops the operation of the working device operation lever 38 and the working device actuator member 39 through preset hydraulic and electronic control logics.

By contrast, if the sliding door 3 secedes from the closed position formed on the outer side wall 2a of the doorway 2b, the contact between the switch driving member 24a' of the lower roller support bracket 24' and the contact part 22a' of the second door position sensing switch 22' is released, and the second door position sensing switch 22' provides the door secession signal to the electronic controller 25. Thereafter, the electronic controller 25 provides the audible and visible alarm signals to the monitor 36 and the alarm 37, and simultaneously performs the operation of the working device operation lever 38 and the working device actuator member 39 through the preset hydraulic and electronic control logics in the same manner.

As described above, according to the sliding door safety device for heavy construction equipment according to the present invention, if the sliding door is not kept in the open position where the sliding door is fully opened or in the closed position where the sliding door is fully closed and secedes from the open position or the closed position, the sliding door safety device senses this, provides an alarm notification to the operator, and stably controls the operation lever in the cab and the working device to improve the workability and manipulability. Also, the sliding door safety device can properly control the operation lever and the hydraulic supply performance of the working device depending on whether the door secedes from the open position or the closed position.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A sliding door safety device for heavy construction equipment, comprising:
   an outer side wall having a doorway formed thereon;
   an upper rail and a lower rail formed on an upper part and a lower part of the outer side wall, respectively;
   a sliding door sliding to move to a front or rear side of a cab by an upper roller and a lower roller engaged with the upper rail and the lower rail, respectively, to open or close the doorway; and
   first and second door position sensing switches both mounted on two sides of the outer side wall to sense a door position when the door is an open position where the door is fully opened or a closed position where the door is fully closed,
   wherein an upper roller support bracket is installed on the inside of the sliding door so that the upper roller is engaged with the upper rail to be rotatable, and a first switch driving member for driving the first door position sensing switch is provided on the support bracket,
   a lower roller support bracket is installed on the inside of the sliding door so that the lower roller is engaged with the lower rail to be rotatable, and a second switch driving member for driving the second door position sensing switch is provided on one side of the lower support bracket,
   an alarm is installed in the cab and is controlled by an electronic controller to provide an alarm signal when the sliding door secedes from the open position or the closed position; and
   a working device operation lever and a working device actuator member which are connected to the electronic controller;
   wherein, when the door secession signal is applied from either of the door position sensing switches, the electronic controller selectively controls the operation of the working device operation lever and the working device actuator member.

2. The sliding door safety device of claim 1, wherein the door position sensing switches are limit switches.

3. The sliding door safety device of claim 1, wherein each door position sensing switch is connected to an electronic controller, and generates a door secession signal when the sliding door secedes from the open position or the closed position.

4. The sliding door safety device of claim 1, wherein if the upper roller moves along the upper rail and the sliding door secedes from the open position or the fully closed position of the door, either of the first and second door position sensing switches generates a door secession signal.

5. The sliding door safety device of claim 1, wherein if the lower roller moves along the lower rail and the sliding door secedes from the open position or the fully closed position of the door, either of the first and second door position sensing switches generates a door secession signal.

6. The sliding door safety device of claim 1, further comprising:
   an upper stopper mounted on the outer side wall, wherein the upper stopper is in contact with the upper roller to prevent the sliding door from shaking when the sliding door is in the open position; and
   a lower stopper mounted on the outer side wall, wherein the lower stopper is in contact with the lower roller to prevent the sliding door from shaking when the sliding door is in the open position,
   wherein one of the first door position sensing switches is positioned adjacent to the upper stopper and one of the second door position sensing switches is positioned adjacent to the lower stopper.

7. The sliding door safety device of claim 1, further comprising:
   a center rail coupled to the outer side wall of the cab; and
   a center roller coupled to the sliding door and engaged with the center rail.

8. The sliding door safety device of claim 7, further comprising a center stopper mounted on the outer side wall, wherein the center stopper is in contact with the center roller to prevent the sliding door from shaking when the sliding door is in the open position.

9. The sliding door safety device of claim 1, further comprising a door fixing holder to fix the sliding door in the open position when the sliding door is fully opened.

10. A sliding door safety device for heavy construction equipment, comprising:
    an outer side wall having a doorway formed thereon;
    an upper rail and a lower rail formed on an upper part and a lower part of the outer side wall, respectively;

a sliding door sliding to move to a front or rear side of a cab by an upper roller and a lower roller engaged with the upper rail and the lower rail, respectively, to open or close the doorway; and first and second door position sensing switches both mounted on two sides of the outer side wall to sense a door position when the door is an open position where the door is fully opened or a closed position where the door is fully closed, wherein an upper roller support bracket is installed on the inside of the sliding door so that the upper roller is engaged with the upper rail to be rotatable, and a first switch driving member for driving the first door position sensing switch is provided on the support bracket, a lower roller support bracket is installed on the inside of the sliding door so that the lower roller is engaged with the lower rail to be rotatable, and a second switch driving member for driving the second door position sensing switch is provided on one side of the lower support bracket, and each door position sensing switch is connected to an electronic controller, and generates a door secession signal when the sliding door secedes from the open position or the closed position, the sliding door safety device further comprising a working device operation lever and a working device actuator member which are connected to the electronic controller, wherein when the door secession signal is applied from either of the door position sensing switches, the electronic controller selectively controls the operation of the working device operation lever and the working device actuator member.

* * * * *